(12) United States Patent
Wallace

(10) Patent No.: US 12,123,213 B1
(45) Date of Patent: Oct. 22, 2024

(54) HUNTING BLIND

(71) Applicant: William C. Wallace, Johnstown, CO (US)

(72) Inventor: William C. Wallace, Johnstown, CO (US)

( * ) Notice: Subject to any disclaimer, the term of this patent is extended or adjusted under 35 U.S.C. 154(b) by 219 days.

(21) Appl. No.: 17/831,399

(22) Filed: Jun. 2, 2022

Related U.S. Application Data

(60) Provisional application No. 63/342,056, filed on May 13, 2022.

(51) Int. Cl.
| | |
|---|---|
| *E04H 15/00* | (2006.01) |
| *A01M 31/02* | (2006.01) |
| *E04H 15/54* | (2006.01) |
| *E04H 15/64* | (2006.01) |
| *E04H 15/44* | (2006.01) |

(52) U.S. Cl.
CPC ......... *E04H 15/001* (2013.01); *A01M 31/025* (2013.01); *E04H 15/54* (2013.01); *E04H 15/64* (2013.01); *E04H 15/44* (2013.01)

(58) Field of Classification Search
CPC ........................... E04H 15/001; A01M 31/025
See application file for complete search history.

(56) References Cited

U.S. PATENT DOCUMENTS

| | | | | |
|---|---|---|---|---|
| 3,323,530 A | * | 6/1967 | Smith | A01M 31/025 |
| | | | | 135/901 |
| 3,609,905 A | * | 10/1971 | Fuhrman et al. | A01M 31/00 |
| | | | | 135/901 |
| 3,799,608 A | * | 3/1974 | Smutny | E04H 1/1205 |
| | | | | 135/117 |
| 3,848,352 A | | 11/1974 | Sayles | |
| 3,886,678 A | | 6/1975 | Caccamo | |
| 3,913,598 A | * | 10/1975 | Glutting, Jr. | E04H 15/48 |
| | | | | D25/16 |
| 4,110,941 A | | 9/1978 | Scott | |
| 4,164,089 A | | 8/1979 | George | |
| 4,483,090 A | | 11/1984 | Carper | |
| 4,738,045 A | | 4/1988 | Cardozo | |

(Continued)

FOREIGN PATENT DOCUMENTS

WO 2021181126 9/2021

OTHER PUBLICATIONS

MW Research and Development, Inc., "CamoScience™ App Instantly Transforms Your Photos Into Custom Next-Gen Camouflage Designs", PR Newswire, Feb. 25, 2011, 3 pages.

(Continued)

*Primary Examiner* — David R Dunn
*Assistant Examiner* — Danielle Jackson
(74) *Attorney, Agent, or Firm* — Vobach IP Law, LLC

(57) ABSTRACT

In accordance with one embodiment, an apparatus can be implemented that includes a frame comprising a first support member and a second support member; a first flexible sheet of fabric comprising a first end portion and a second end portion on an opposing end of the fabric from the first end portion; a coupler coupled with the first end portion and configured to couple the first end portion with the first support member of the frame; wherein the coupler is configured to decouple the first end portion from the first support member via a hands-free operation.

16 Claims, 18 Drawing Sheets

(56) References Cited

U.S. PATENT DOCUMENTS

| | | | | |
|---|---|---|---|---|
| 4,794,717 | A * | 1/1989 | Horsmann | A01M 31/025 135/901 |
| 4,926,893 | A * | 5/1990 | Klopfenstein | E04H 15/001 135/901 |
| 5,377,711 | A * | 1/1995 | Mueller | E04H 15/001 135/901 |
| 5,414,950 | A * | 5/1995 | Johnson, Sr. | E04H 15/001 135/901 |
| 5,458,079 | A * | 10/1995 | Matthews | B63B 17/02 114/361 |
| 5,477,875 | A | 12/1995 | Daly, Jr. | |
| 5,730,080 | A | 3/1998 | Cripe | |
| 5,906,217 | A * | 5/1999 | Hill | E04H 15/48 135/132 |
| 6,938,632 | B2 | 9/2005 | Coursey | |
| 7,568,492 | B1 | 8/2009 | Helmer | |
| 7,743,781 | B2 * | 6/2010 | Slaughter | E04H 15/001 135/117 |
| 7,900,645 | B2 | 3/2011 | Bunce | |
| D672,843 | S | 12/2012 | Snowden | |
| 8,365,751 | B2 * | 2/2013 | Clampitt | E04H 15/001 135/124 |
| 8,701,691 | B2 | 4/2014 | Hawk | |
| 9,072,290 | B1 | 7/2015 | McCauley | |
| 9,316,017 | B1 * | 4/2016 | Slaughter | E04H 15/001 |
| 9,347,237 | B2 | 5/2016 | Ponciano | |
| 10,400,470 | B2 | 9/2019 | Brune | |
| 11,382,401 | B2 * | 7/2022 | Schmitt | A45F 4/02 |
| 11,655,650 | B2 * | 5/2023 | Wood | A01M 31/025 135/139 |
| 2006/0169309 | A1 * | 8/2006 | Brackins | E04H 15/14 135/119 |
| 2011/0203629 | A1 * | 8/2011 | Smith | E04H 15/001 135/121 |
| 2013/0306121 | A1 * | 11/2013 | Hung Lau | A01M 31/025 135/117 |
| 2020/0305413 | A1 * | 10/2020 | Thayer | A01M 31/02 |
| 2021/0161123 | A1 | 6/2021 | Wood | |
| 2021/0298287 | A1 | 9/2021 | Wood | |
| 2022/0333399 | A1 * | 10/2022 | Varnum | A01M 31/025 |

OTHER PUBLICATIONS

"Drake Waterfowl Ghillie Boat Blind with No Shadow Dual Action Top", last accessed at "https://www.basspro.com/shop/en/drake-waterfowl-ghillie-boat-blind-with-no-shadow-dual-action-top" on Jan. 27, 2023.

Knutson's Sporting Goods, last accessed at "http://www.knutsondecoys.com/blinds/groundblinds.html" on Jan. 27, 2023, 11 pages.

* cited by examiner

HUNTING BLIND

CROSS-REFERENCES TO RELATED APPLICATIONS

This application claims the benefit of U.S. Provisional patent application No. 63/342,056 filed on May 13, 2022 entitled "HUNTING BLIND" which is hereby incorporated by reference in its entirety and for all purposes.

SUMMARY

In accordance with one embodiment, an apparatus can be implemented that includes a frame comprising a first support member and a second support member; a first flexible sheet of fabric comprising a first end portion and a second end portion on an opposing end of the fabric from the first end portion; a coupler coupled with the first end portion and configured to couple the first end portion with the first support member of the frame; wherein the coupler is configured to decouple the first end portion from the first support member via a hands-free operation.

In accordance with another embodiment, an apparatus can be implemented that includes a frame comprising a first support member and a second support member; a first flexible sheet of fabric comprising a first end portion and a second end portion on an opposing end of the first flexible sheet of fabric from the first end portion; a first coupler coupled with the first end portion and configured to couple the first end portion with the first support member of the frame; wherein the first coupler is configured to decouple the first end portion from the first support member via a hands-free operation; a second coupler coupled with the second end portion and configured to couple the second end portion with the second support member of the frame; a second flexible sheet of fabric comprising a third end portion and a fourth end portion on an opposing end of the second flexible sheet of fabric from the third end portion; a third coupler coupled with the third end portion and configured to couple the third end portion with the first support member of the frame; wherein the third coupler is configured to decouple the third end portion from the first support member via a hands-free operation.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Other features, details, utilities, and aspects of the claimed subject matter will be apparent from the following more particular written Detailed Description of various implementations and as further illustrated in the accompanying drawings.

DETAILED DESCRIPTION

Figure 1A:
FIGS. 1A, 1B, 1C, 1D, 1E, and 1F illustrate an example of operation of a hunting blind, in accordance with one embodiment.
Figure 1A:
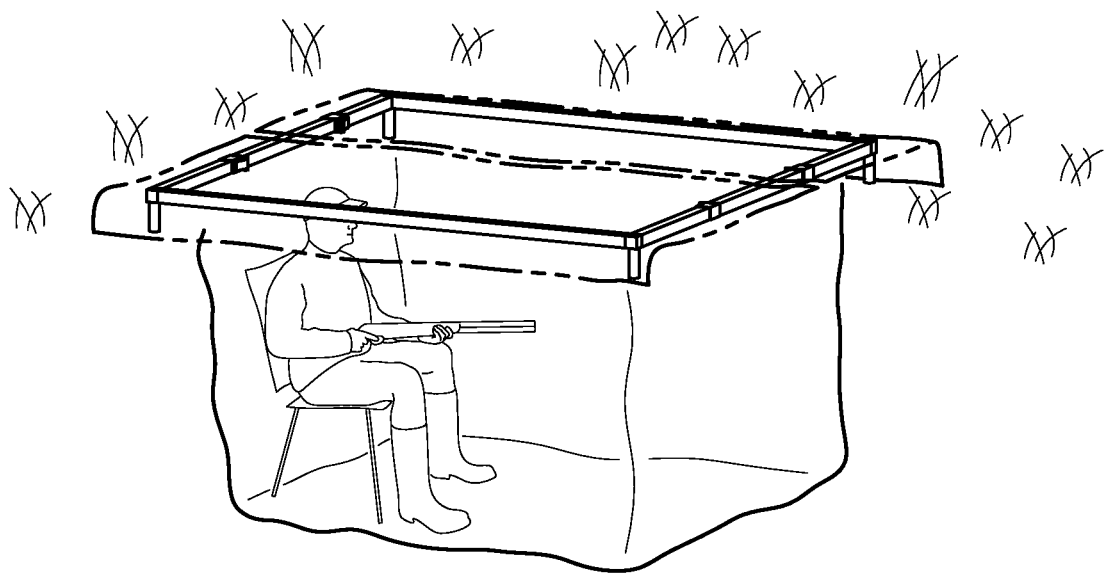

Hunting blinds are used to impede game from detecting the presence of hunters. In the case of hunting for fowl, such as geese, ducks, and doves, hunters will often orient themselves in a below ground structure such as a pit. The pit can be covered with native terrain material, such as cornstalks, reeds, or other material. This native material disguises the pit when the fowl are flying towards the pit. Fowl that have witnessed hunters in the past know to be cautious if the ground surface includes any abnormal disruption. This can include a disruption in the ground surface, which might indicate the presence of a hunter's pit—or even the presence of tire tracks in a field that may indicate that hunters have been driven out to a hunting pit. Fowl will change their line of flight if they sense hunters in the area. Thus, disguising a hunting pit is neither an easy nor a straightforward process.

In the past, others have attempted to disguise themselves using a variety of devices. One drawback to many of these devices is that they required the hunter to activate a lever to throw open a hatch cover. The hunter can then stand up through the opened hatch cover, proceed to place both hands on his or her firearm, and take a shot at the fowl flying overhead. Such devices have drawbacks, however. First, the hand-activation of such devices delays the hunter from gripping his or her firearm and taking aim at the fowl. The amount of time that a hunter has available to take a shot is often quite limited. The hunter wants the approaching fowl to get close to the hunting blind before taking a shot. So, the delay caused by the hand-activation and opening of a hatch cover inhibits a hunter's ability to do so.

Second, hand-activated hatch covers can be dangerous. Because the hunter is rushing to move from activating the hatch cover to grabbing his or her firearm, there is the possibility of the hunter mishandling his or her firearm and accidentally firing it. This can cause the hunter to possibly shoot himself or herself—there have been many reported cases of hunters accidentally shooting themselves in the foot, for example. Or worse, since there is often more than one hunter in a single pit, a hunter might accidentally shoot another hunter.

Third, the opening of hatch covers can spook the approaching fowl. Many of the hatch covers are formed of a solid sheet of material that is spring-loaded to be forced open. The hatch cover typically swings upward in a fast and noticeable manner. As a result, the approaching fowl see the hatch cover being opened and flare away from the hunting blind. The hunter is then left with either no shot or a longer distance shot than would have occurred if the fowl had not been caused to flare.

Fourth, an opened hatch cover can block, impede, or disturb a hunter's shot. Usually, these hatch covers will open to a raised position so that at least one side of the hunting blind is impeded. A hunter will not be able to aim his or her firearm in that blocked direction because the hatch cover is blocking the hunter's firing lane. A hunter might also physically impact the opened hatch cover as the hunter is tracking fowl with his or her firearm in the process of preparing to take a shot. This can cause an accidental firing and be potentially dangerous to the hunter and his or her hunting companions. And, in a high wind situation, such as out on the plains where winds can sweep across the land with no structures to impede them, the opened hatch cover can blow into the hunter disturbing his or her shot.

Fifth, the hand-activated hatches can easily be impacted by cold temperatures. Since hunting often takes place in cold weather, the mechanical activation mechanisms can become wet from snow, sleet, and rain. Once wet with moisture, they can freeze or be impacted by snow. So, the mechanical reliability of such devices is questionable.

Sixth, hatch covers currently in use can be made of thick material or covered with vegetation in an effort to blend in with the surrounding terrain. Since a hunter often uses "calls" that mimic the sound of fowl, such hatch covers can insulate the sound emanating from the pit. For example, if the hunter has surrounded the hunting pit with 150 goose decoys, the hunter will want to mimic the sound of 150 geese. The ability to do so is frustrated if the pit where the hunter is located is covered with a thick piece of material or thick vegetation. The sound might, for example, have a dulled sound due to the pit cover. Thus, approaching fowl will sense that something is not right.

These hand-activated hatches are also heavy—so they are not easily transported to a hunting area. They have a fixed footprint—thus they are not easily modified to fit over different pits of varying dimensions, for example. They are not easily modified to adjust to varying ground conditions— thus they are not easily modified to switch between snowy ground camouflage and clear ground camouflage on the same hunting day, for example.

FIGS. 1A, 1B, 1C, 1D, 1E, and 1F illustrate a hunting blind in accordance with one embodiment. In FIG. 1A, a hunter sits in a hunting pit that has been disguised by a hunting blind. The blind is shown as a frame and at least one sheet of flexible material disposed on the frame. The frame is positioned on the surface of the ground neighboring the pit. And, at least one sheet of flexible material is coupled with the frame. In this example, two flexible sheets of material are used. Preferably, the surface of the flexible sheet of material that faces the sky is disguised with a camouflage pattern that blends in with the surrounding ground surface. Fowl are shown in flight approaching the hunting blind.

Figure 1B:
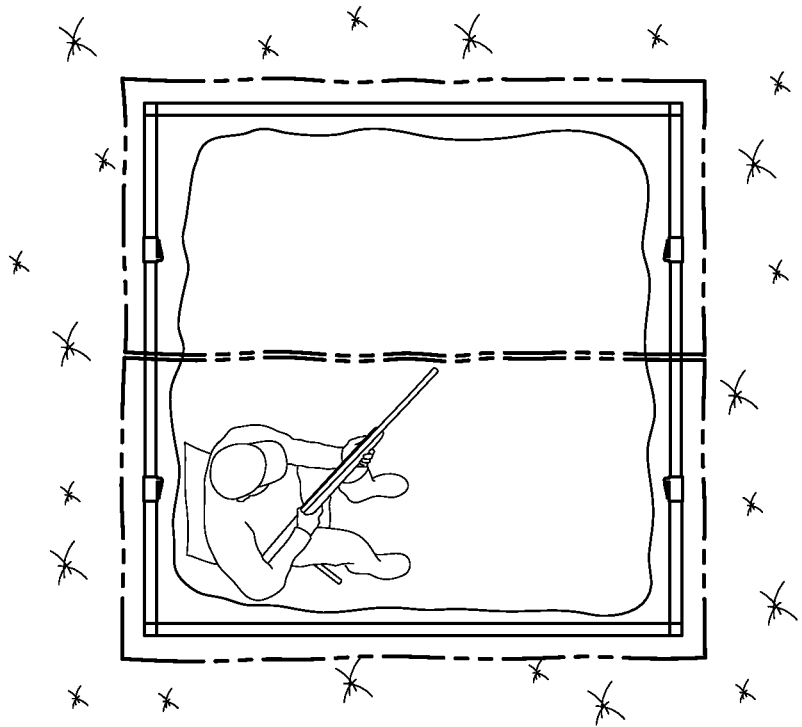

FIG. 1B illustrates a top view of the arrangement in FIG. 1A. The hunter is shown sitting in the pit and beneath the two sheets of flexible material. A camouflage pattern on the upward facing surface of the flexible sheets of material helps to disguise the presence of the pit and the presence of the hunter in the pit. The flexible sheets of material are shown disposed on the frame and extending beyond the outer edges of the frame.

As can be seen in FIG. 1B, the two flexible sheets of material can be mounted on the frame so that a slight gap of space exists between the adjoining edges of the two flexible sheets of material. This gap can serve two purposes. First it provides a completely unobstructed view for the hunter through the gap left between the two sheets. This allows the hunter to get a good view of approaching fowl. Second, it allows the hunter to prepare for a shot by extending at least a portion of his or her firearm through the gap. This can be accomplished in a hands-free manner without any adjustment of the hunting blind as the hunter begins to take a shooting position for a shot at the fowl. A slight movement of the flexible sheet of material might occur due to the firearm pushing through the gap; but, this can take place without decoupling the flexible sheet of material from the frame. Due to the flexible nature of the flexible sheets of material, it is unlikely that approaching fowl would take notice of the hunting blind when the hunter extends his or her firearm through the gap in preparation for taking a shot.

Figure 1C:
Figure 1C:
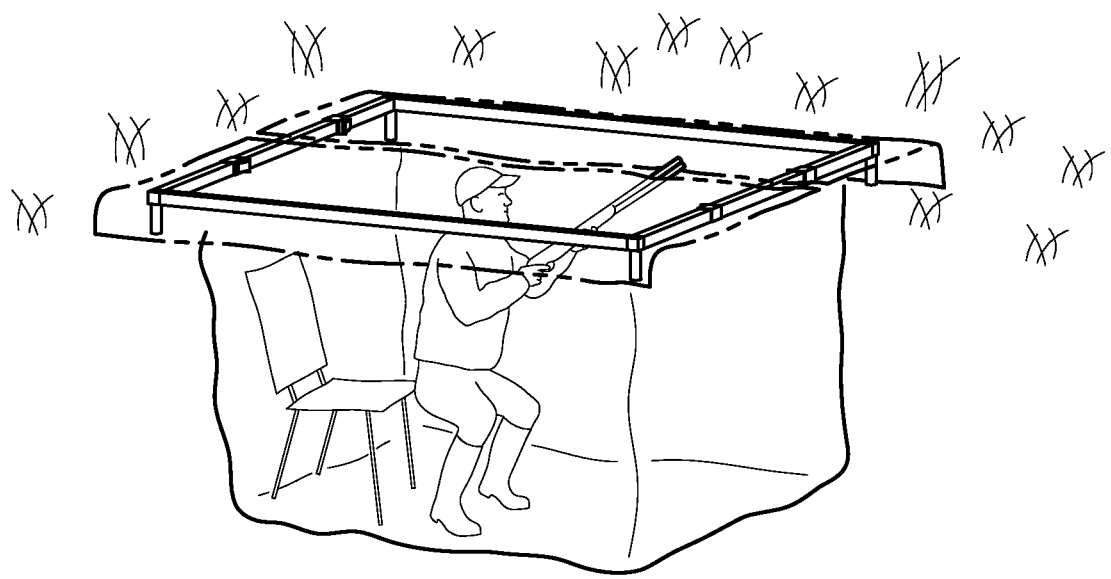
Figure 1D:
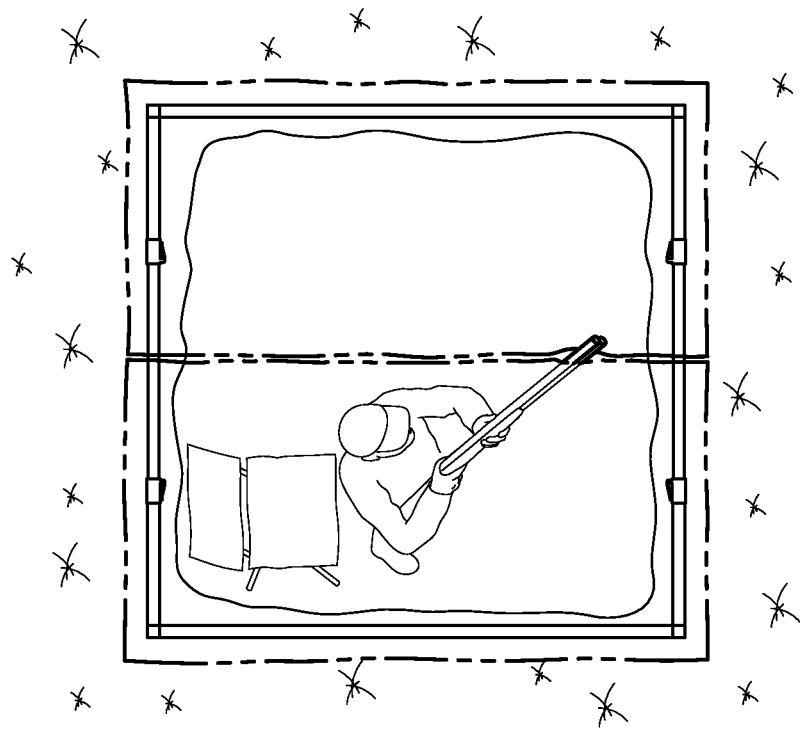

FIGS. 1C and 1D illustrate this in better detail. In FIG. 1C, the hunter has decided that the approaching fowl will be in range of the hunting blind. The hunter is shown having stood up from his seated position in the hunting pit. FIG. 1D shows that the hunter has extended the barrel of his firearm partially through a gap between the flexible sheets of material. From this position, the hunter has at least two options for taking a shot. The hunter can remain underneath the flexible sheets of material and take a shot. Or, the hunter can rise up further into a more vertical position and push past the flexible sheets of material with his firearm, head, and possibly shoulders.

By standing up vertically and extending his head and shoulders through the flexible sheets of material, the hunter attains a better view of the fowl and can take a clean shot. To the extent that either or both of the flexible sheets of material are partially uncoupled from the frame, they will fall under the force of gravity into the pit. In this manner, the hunter's view is not obstructed by the hunting blind when the hunting blind is in an opened position. Moreover, the hunter has a 360 degree turning radius with unobstructed shooting lanes.

Notably, the hunter can rise to a shooting stance with both hands on his firearm. The hunter does not have to use one hand to hold the firearm and the other hand to open the blind. As noted above, such a one-handed technique can be dangerous and lead to accidental firings of the hunter's firearm. Rising to a shooting stance with both hands already on the firearm also allows the hunter more time to take good aim and make a good shot. It also allows the fowl to get closer to the blind before the hunter has to push through the blind to take a shot. When hand-activated spring blinds were used, the hunter had to activate the hatch cover early enough for the hatch cover to open and for the hunter to re-orient his or her firearm before assuming a firing position. This necessitated opening the blind when the fowl were further away. With the embodiment of the blind described herein, however, a hunter can wait for the fowl to get closer, because the hunter can get through the blind opening and in shooting position more quickly.

Figure 1E:
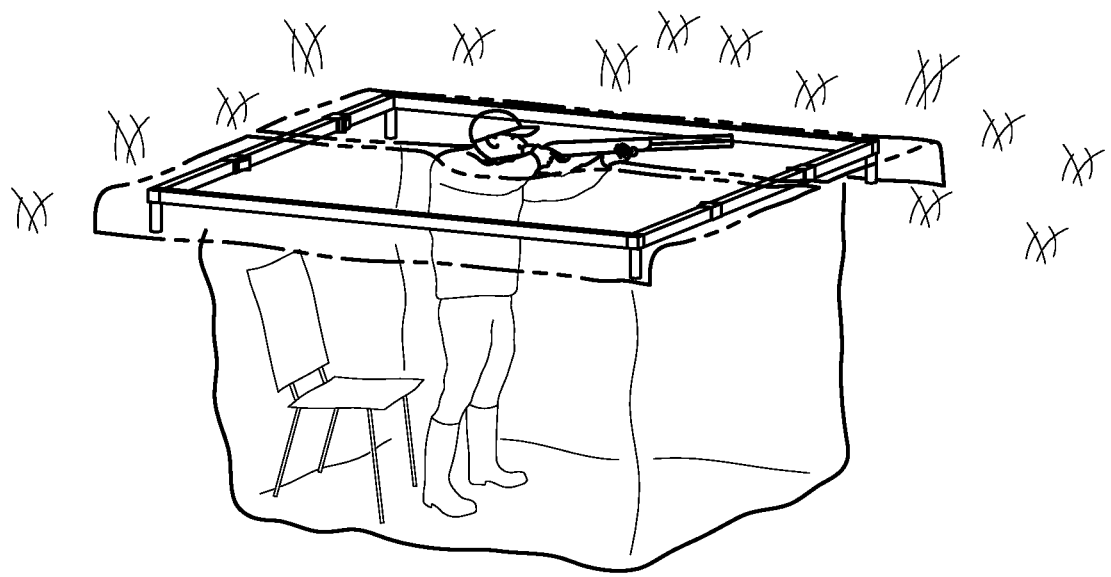
Figure 1F:
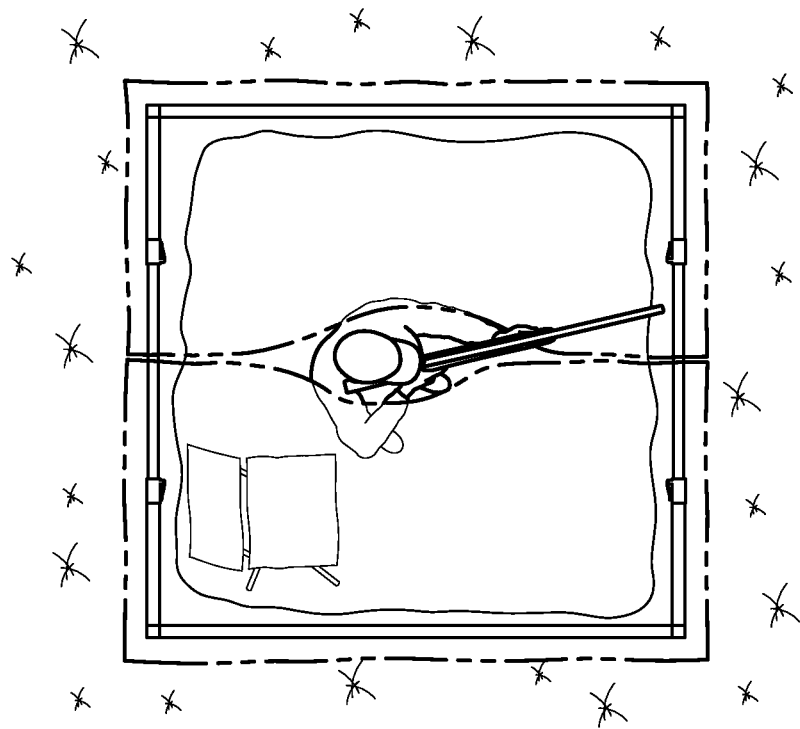

FIGS. 1E and 1F are similar to FIGS. 1C and 1D, but in FIGS. 1E and 1F the hunter has risen so that his head and firearm are above the flexible sheets of material.

Figure 2:
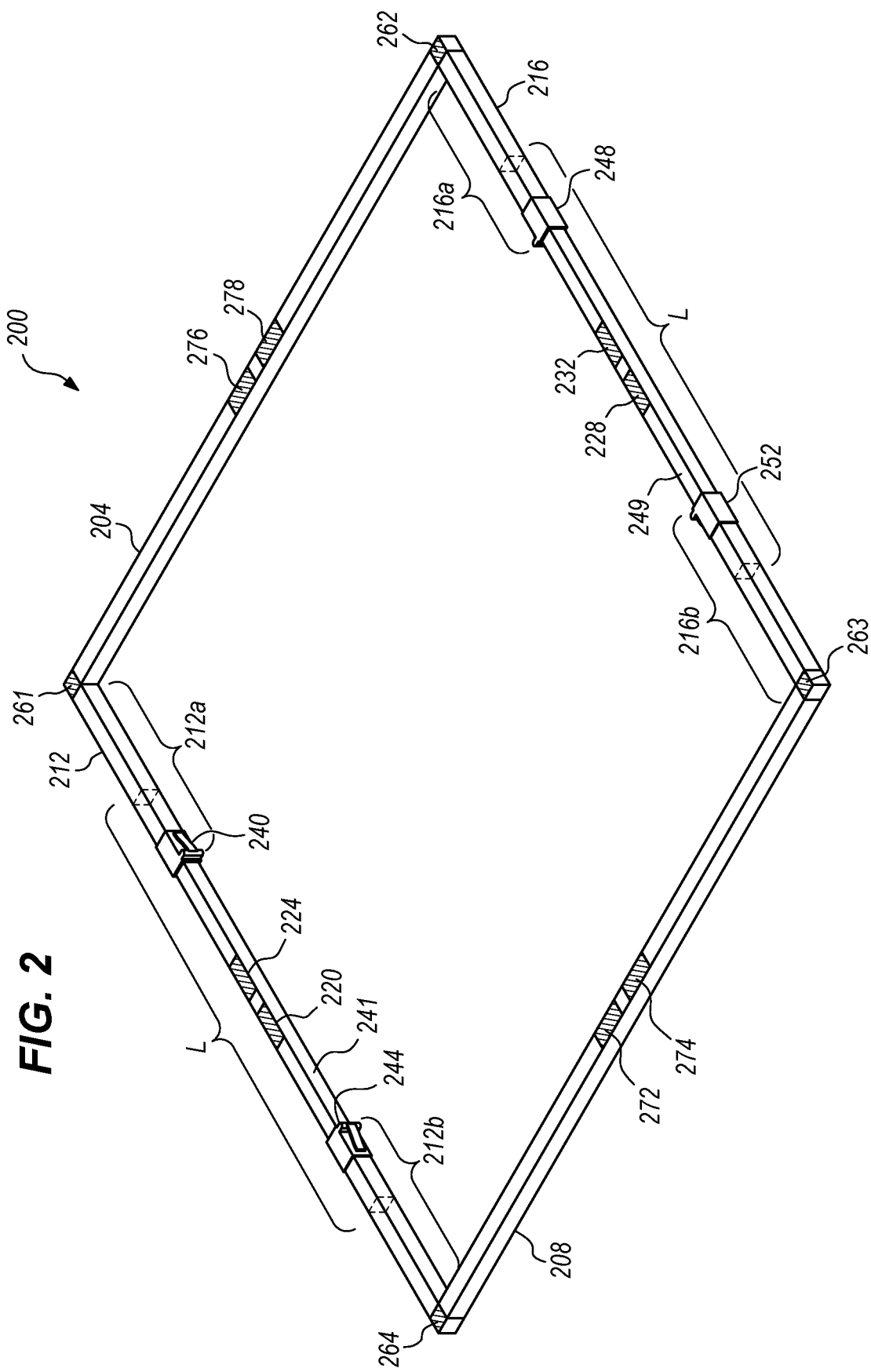
FIG. 2 illustrates a hunting blind frame, in accordance with one embodiment.

FIG. 2 illustrates an embodiment of a frame for use as part of a hunting blind. In FIG. 2, frame 200 is shown having a first support member 212 (formed by the combination of pieces 212a, 212b, and 241) and a second opposing support member 216 (formed by the combination of pieces 216a, 216b, and 249). A third support member 204 and fourth support member 208 are also shown. The support members are coupled together to form a generally quadrilateral shape. The shape need not be generally quadrilateral in all embodiments, however. A generally circular, generally elliptical, or generally polygonal shape could also be used, for example.

The frame can also include legs to support the main body of the frame off the ground during operation as a hunting blind. For example, legs could be positioned in each of the four corners of frame 200.

The embodiment of the frame shown in FIG. 2 is shown as an expandable frame. However, one might alternatively choose to fabricate the frame with fixed length support members. In FIG. 2, piece 241 has a smaller outer diameter than the inner diameter of piece 212a. This allows a telescoping arrangement between pieces 241 and 212a so that the length of support member 212 can be adjusted. Clamp 240 couples together piece 241 and 212a in a stable configuration. Similarly, piece 212b and piece 241 can similarly form a telescoping arrangement. Pieces 212b and 241 can be coupled together by clamp 244. Piece 241 has a length "L" and dashed lines illustrate the ends of piece 241.

A similar telescoping arrangement is shown by piece 249 and pieces 216a and 216b. Piece 216a is shown with an inner diameter greater than the outer diameter of piece 249. A clamp 248 couples together pieces 249 and 216a. Similarly, a telescoping arrangement is shown by pieces 216b and piece 249. A clamp 252 couples together pieces 249 and 216b.

An expandable frame permits a hunter to adjust the frame to fit over pits or areas of different sizes. For example, since not all pit openings will be of the same size, the expandable frame permits the hunter to adapt the frame to different hunting pits having differently sized openings.

At least one flexible sheet of material can be coupled to the frame. This can be accomplished in a variety of ways. For example, the coupler can be a magnetic coupler that uses a magnetic force to couple the flexible sheet of material to the frame. This can be accomplished, for example, by attaching a magnet to the end portion of the flexible sheet of material and allowing it to be attracted to a magnetic or ferromagnetic portion of the frame. For example, FIG. 2 shows magnets 220, 264, 263, and 228 positioned along the frame. A rectangular, flexible sheet of material with magnets in a similar spatial arrangement could be coupled with these magnets on the frame. Or, if all or a portion of the frame is made of ferromagnetic material (such as steel), the magnets of the flexible sheet of material could be coupled with the ferromagnetic parts of the frame. Alternatively, free-standing magnets (e.g., magnets independent from the flexible sheet of material) could be used to sandwich the flexible sheet of material between the frame and the free-standing magnets. Alternatively, magnets coupled to the frame could be used to couple with ferromagnetic material coupled to the flexible sheet of material, such as pieces of steel.

A second flexible sheet of material can be coupled to magnets 224, 261, 262, and 232 in a similar manner, for example. Similarly, one larger flexible sheet of material could be coupled to magnets 261, 262, 263, and 264 in order to cover the entire frame. Magnets 220, 224, 228, and 232 could further assist in coupling the flexible sheet of material, if desired. Similarly, one might choose to place magnets at other positions along the frame to permit further coupling of the flexible sheet of material with the frame. For example, magnets 272, 274, 276, and 278 could be used for this. These magnets also facilitate orienting the flexible sheets of material at 90 degrees to what was described above. One might even choose to place magnets along the bottom of the frame to allow the hunter to tuck and couple any excess long end portions of the flexible sheet of material under the frame. This might be useful on windy days to avoid flapping of the end portions in the wind.

Another coupler that could be used is a combination of hook material and loop material. By placing opposing pieces of hook material and loop material on the frame and the opposing portion of the flexible sheet of material, respectively, a coupling can be accomplished by pressing the opposing pieces together. When the frame is formed with legs, a hunter can easily reach through the space between the ground and the frame, reach above the flexible sheet of material, position the flexible sheet of material on the frame, and couple the hook material and loop material together. Similarly, the hunter can do the same when a magnetic coupler is used.

One of the benefits of using a magnetic coupler or a hook and loop coupler is that during coupling and decoupling of the flexible sheet of material from the frame, there is very little noise created. Thus, decoupling of the flexible sheet of material does not cause the approaching fowl to flare because they are not disturbed by the noise, even if they can hear it. When others have used mechanical spring-loaded devices in the past, the opening of the hatch cover in those devices not only created a large visual disturbance but also a loud auditory disturbance. Each can cause approaching fowl to flare. Moreover, magnetic couplers and hook and loop couplers are examples of couplers that can be forced apart by a hunter pushing against the flexible sheet of material with the barrel of his or her firearm or the hunter's head or hunter's head and shoulders. These types of couplers can be decoupled by hands-free operation. A "hands-free operation" is intended to mean a de-coupling operation that does not require the use of the hands on the coupler itself. One example of this is a hunter standing up from beneath the blind and pushing the blind open with his head.

Even a hunter's hunting dog can exert enough force to decouple such couplers when exiting the blind to retrieve downed fowl. In one embodiment, one might choose to fabricate the flexible sheet of material with a flap sized for a hunting dog to exit through the flexible sheet of material without decoupling a larger portion of the flexible sheet of material. Also, the hands-free operation of the hunting blind facilitates a dog being able to exit the blind of its own volition. A hunter does not need to open the blind—rather the hunter can merely issue a retrieve command to the dog and the dog can open the blind with the force of its body against the cover to separate the cover from the frame sufficiently to create an opening.

A benefit of magnetic and hook and loop types of couplers is that they tend to be freeze-resistant and thus reliable in wet and/or cold weather. There is little risk of them not performing due to freezing temperatures or wet conditions, unlike some spring-operated mechanical devices. The term "freeze-resistant" is intended to mean that the coupler will still operate effectively when operating weather conditions are in the temperature range of 35 degrees to minus 50 degrees Fahrenheit.

Figure 3:
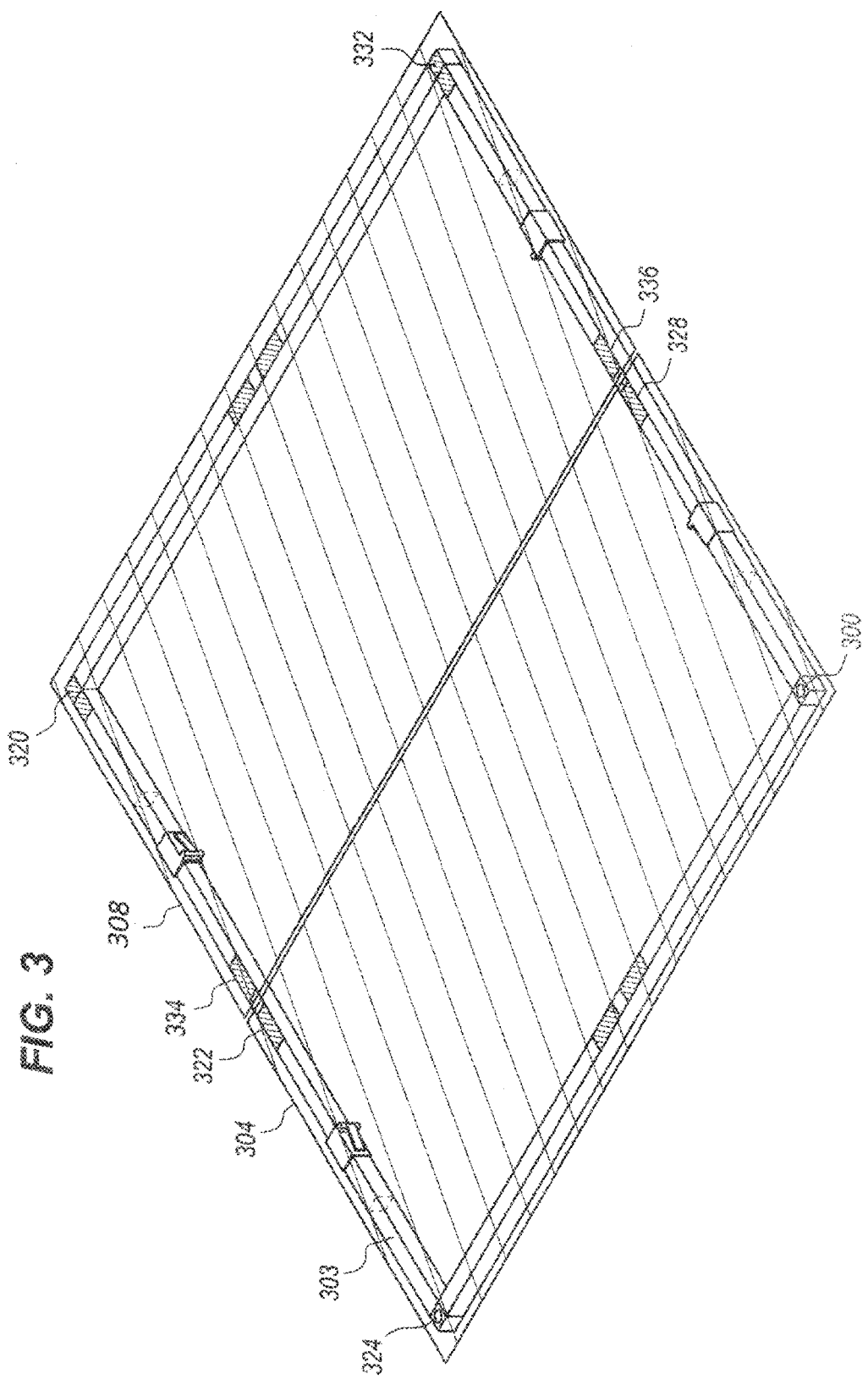
FIG. 3 illustrates a hunting blind frame coupled with two flexible sheets of material, in accordance with one embodiment.

FIG. 3 illustrates an embodiment of a hunting blind 300 that utilizes two flexible sheets of material. In this embodiment, a first flexible sheet of material 304 is shown coupled to frame 303 using magnetic couplers 324, 322, 328, and 330. In this embodiment, magnetic couplers 322 and 328 are magnets that are attached to flexible sheet of material 304, e.g., they might be adhesively coupled to the flexible sheet of material or secured in a pocket formed by sewn together pieces of fabric. Magnetic couplers 324 and 330 are freestanding magnets that are not attached to the flexible sheet of material. Instead, they simply sandwich the flexible sheet of material between themselves and a metallic portion of the frame or other magnets on the frame.

A second flexible sheet of material 308 is also shown in FIG. 3. This flexible sheet of material is coupled to the frame using magnets 334, 320, 332, and 336. These magnets are all attached to the flexible sheet of material 308, in this embodiment. The magnets are attached to the flexible sheet of material in the end portions of the flexible sheet of material, i.e., they do not have to be attached to the very end of the flexible sheet of material, although they could be.

In one embodiment, the end portions of the flexible sheet of material could be coupled with weights that cause the end portions to fall under the force of gravity towards the ground. This would assist in reducing wind flapping of the end portions of the flexible sheet of material.

A gap is shown between the adjoining edges of the first flexible sheet of material 304 and the second flexible sheet of material 308. The gap can be adjusted by the hunter during use. Depending on conditions, the hunter might prefer no gap, a small gap, or a wide gap. The smaller the gap is, the more concealed the hunter will be from approaching fowl in flight. However, a small gap or a large gap might provide a hunter with a better view of approaching fowl in flight. And, a gap also assists a hunter in raising his or her firearm and/or head between the flexible sheets of material to either take a shot or look at the surrounding area.

The couplers allow the hunter to adjust the flexible sheets of material on the hunting blind frame. Thus, the hunter can position the flexible sheets of material in a manner suitable for the conditions and for the desired shooting position.

Figure 4:
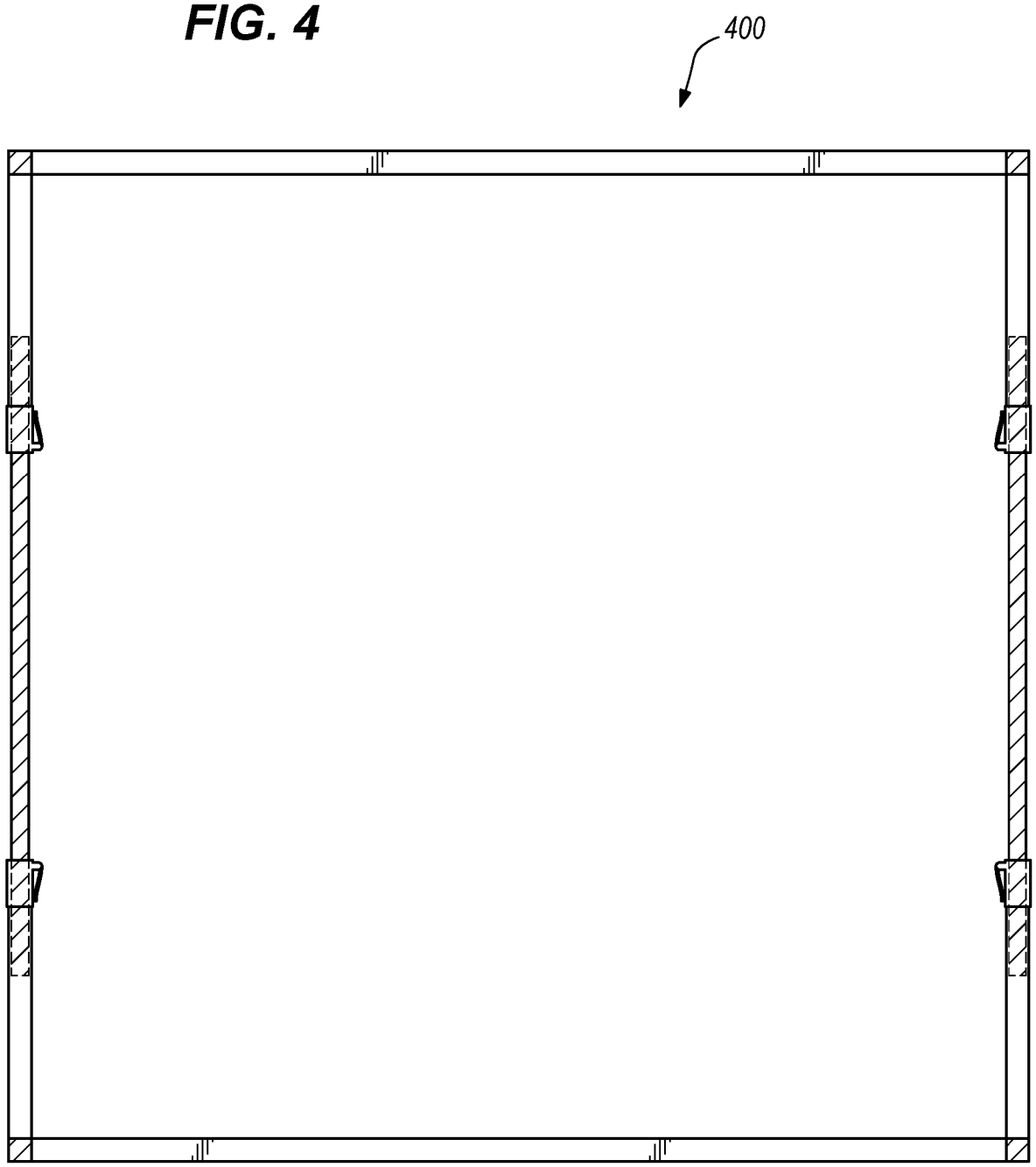
FIG. 4 illustrates an expandable hunting blind frame in an expanded orientation, in accordance with one embodiment.
Figure 5:
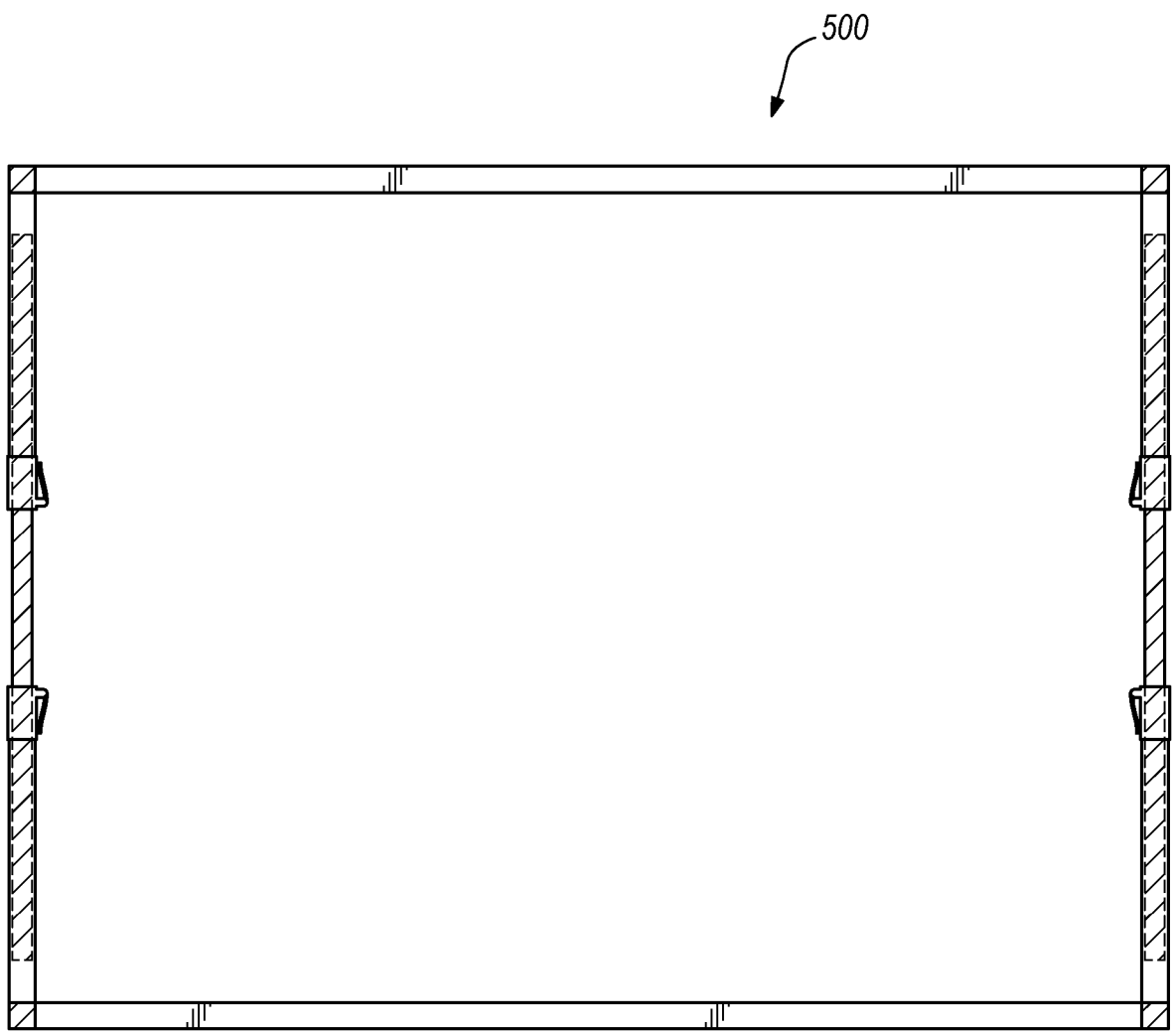
FIG. 5 illustrates an expandable hunting blind frame in a collapsed orientation, in accordance with one embodiment.

FIGS. 4 and 5 further illustrate an embodiment of a hunting blind with an expandable frame. FIG. 4 shows the frame 400 in an expanded position. FIG. 5 shows the frame 500 in a more collapsed position. As can be seen, the frame in FIG. 4 would accommodate a longer pit opening. In some hunting pits, multiple hunters are in the pit at the same time. And, sometimes their hunting dog(s) accompany them in the pit. Thus, since there is no standardized size for a hunting pit, the expandability of the frame accommodates differing pit opening sizes. Multiple frames can be used together by positioning them side by side over a pit, as well. A generally straight edge of the frame facilitates frames being placed side by side in such an embodiment.

Figure 6:
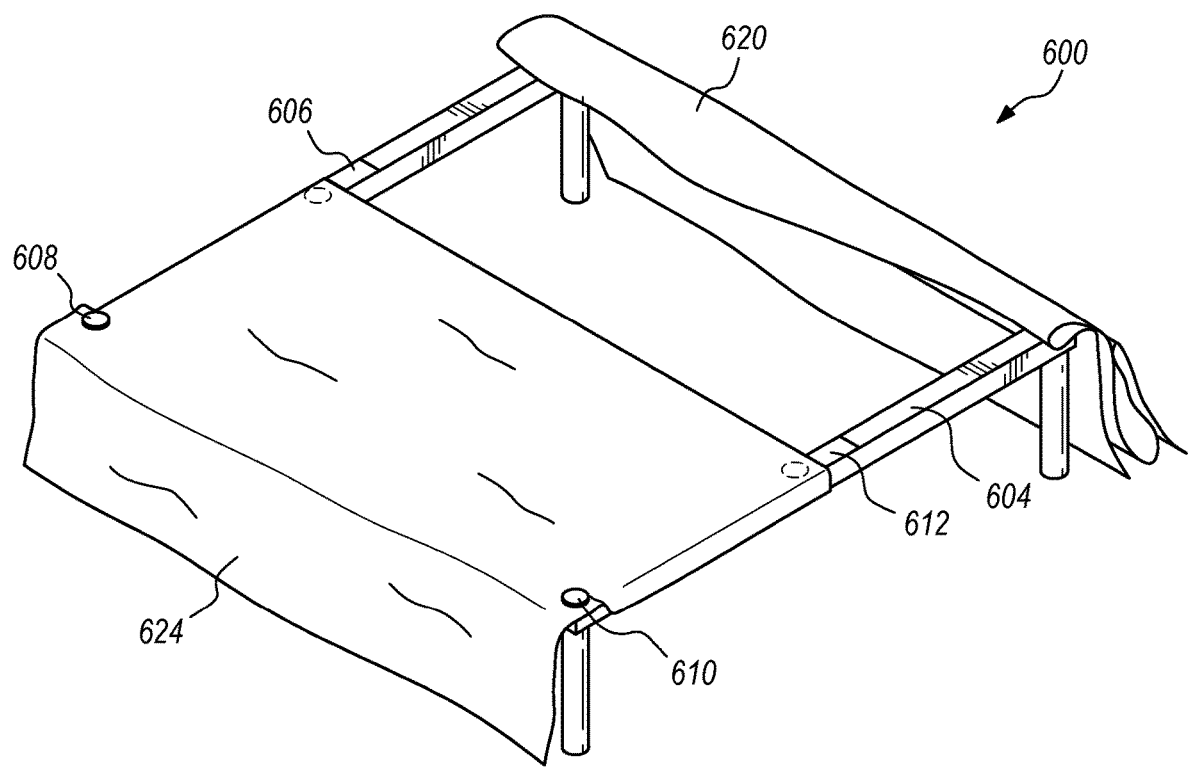
FIG. 6 illustrates a hunting blind frame with a first sheet of flexible material in an open position and a second flexible sheet of material in a camouflaging position, in accordance with one embodiment.

FIG. 6 illustrates an embodiment of a hunting blind 600 that utilizes a frame 604 and two flexible sheets of material 620 and 624. The flexible sheets of material are made of a fabric, such as UltraMesh Pro fabric which is manufactured by Ultraflex Systems of Riverview, Florida. However, one might choose to use other material, such as polyester, canvas, burlap, or vinyl, for example. UV protective coating could also be added to some of these materials as protection in outdoor environments. The fabric in the embodiment of FIG. 6 is transparent such that it is sufficient to allow a hunter with 20/20 eyesight to see through the fabric and visually detect approaching fowl in flight, e.g., approaching geese at a distance of 200 yards away. The outer surface of the flexible sheet of material is imprinted with a camouflage design. The camouflage design allows the blind to blend in with the ground surface materials where the hunter is located. For example, one might choose to imprint a harvested field design, a snowscape design, a dirt surface design, a river fauna design or some other camouflage design on the fabric. In FIG. 6, one of the flexible sheets of material is shown partially decoupled from the frame. Magnets 606 and 612 are screwed into frame support members. Magnets attached to flexible sheet of material 620 are oriented so that their magnetic fields facilitate coupling with magnets 606 and 612 when the flexible sheet of fabric is positioned in a closed position, also referred to as a camouflaging position. During use, the hunter can push up the flexible sheet of material and de-couple the flexible sheet of material 620 from the frame. The de-coupled flexible sheet of material will fall under the force of gravity toward the ground. Therefore, the de-coupled flexible sheet of material will not obstruct the hunter when the hunter is taking a shot at the approaching fowl. Flexible sheet of material 624 is shown in the closed position, also referred to as the camouflaging position on the frame. Magnets attached to the flexible sheet of material couple magnetically with magnets 606 and 612. A hunter can use free-standing magnets 608 and 610 to sandwich the flexible sheet of fabric 624 between the free-standing magnets and the frame. This permits the hunter to take slack out of or add slack to the flexible sheet of material 624, as desired.

Figure 7:
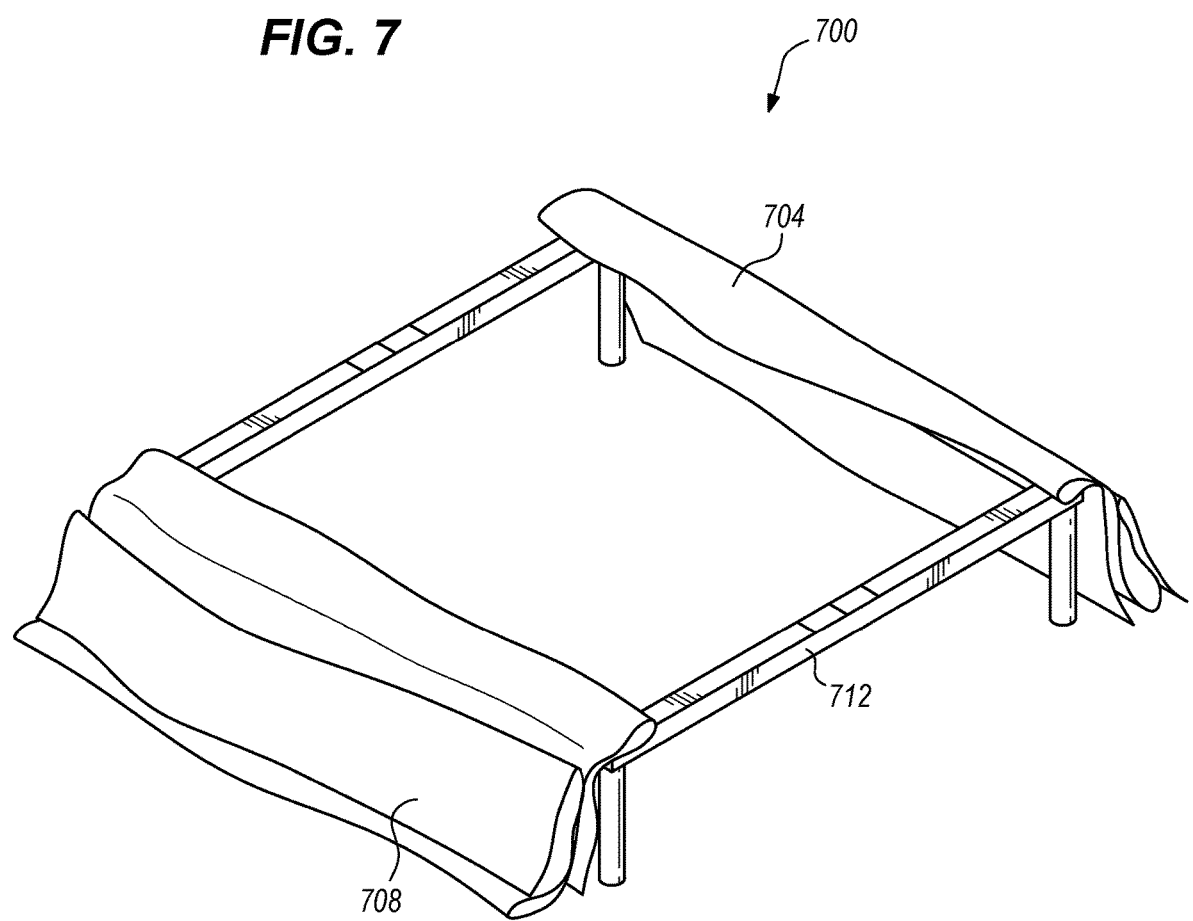
FIG. 7 illustrates a hunting blind frame with two sheets of flexible material in the open position, in accordance with one embodiment.

FIG. 7 shows an example of a hunting blind 700 in which two flexible sheets of material (704 and 708) have been partially de-coupled from the frame 712.

Figure 8:
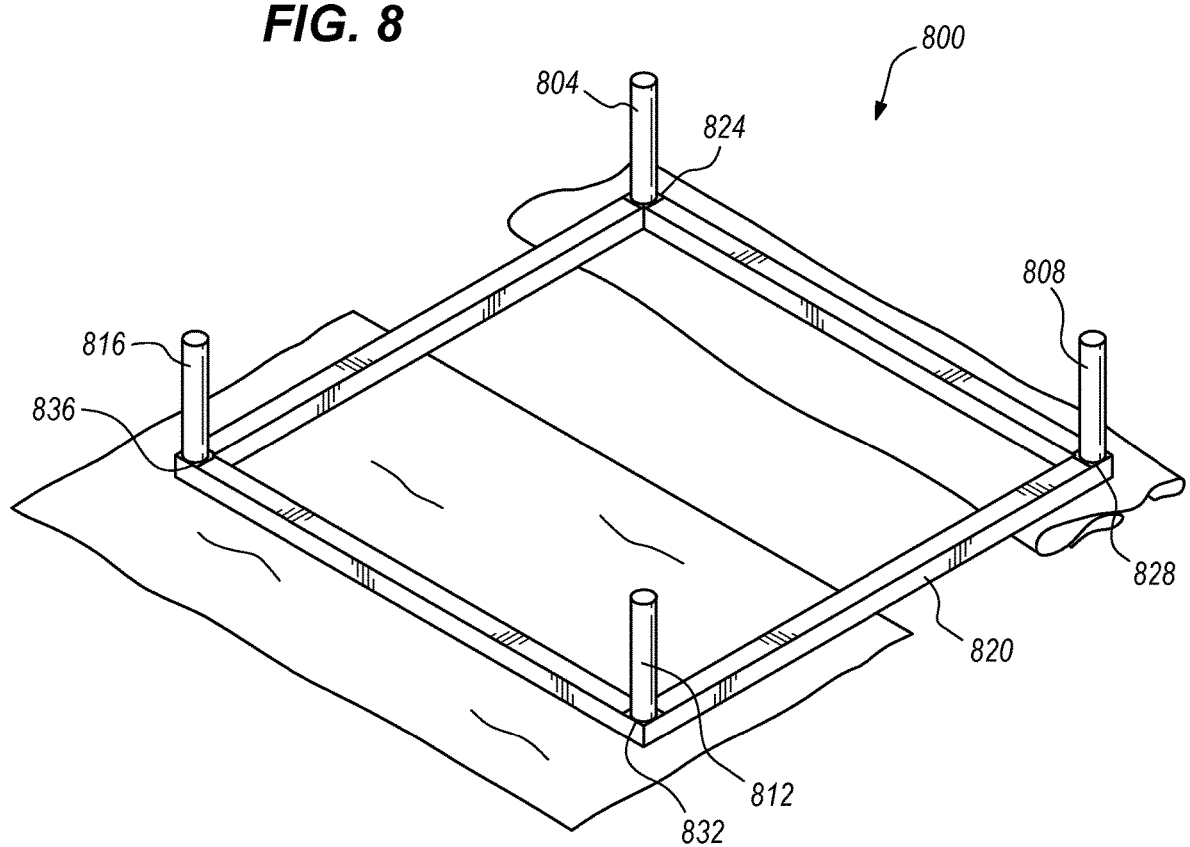
FIG. 8 illustrates a bottom view of a hunting blind with one flexible sheet of material in an open position and a second flexible sheet of material in a camouflaging position, in accordance with one embodiment.

FIG. 8 shows an example of a hunting blind 800 shown from below. In this embodiment, legs 804, 808, 812, and 816 are shown in the corners of the frame 820. The legs support the frame and keep the main body of the frame and the flexible sheets of material off the ground during use, which can be beneficial if the terrain is muddy, for example. One might choose different lengths of legs to use for the frame. For example, legs of 2 inches or 4 inches or 6 inches might be desired. Magnets 824, 828, 832, and 836 can be coupled to the corner portions of the frame and/or to the tops of the legs so that a magnetic coupling can be made between the tops of the legs and the frame when legs are used. Or, mechanical couplers could be utilized, alternatively, to couple the legs to the frame.

Figure 9:
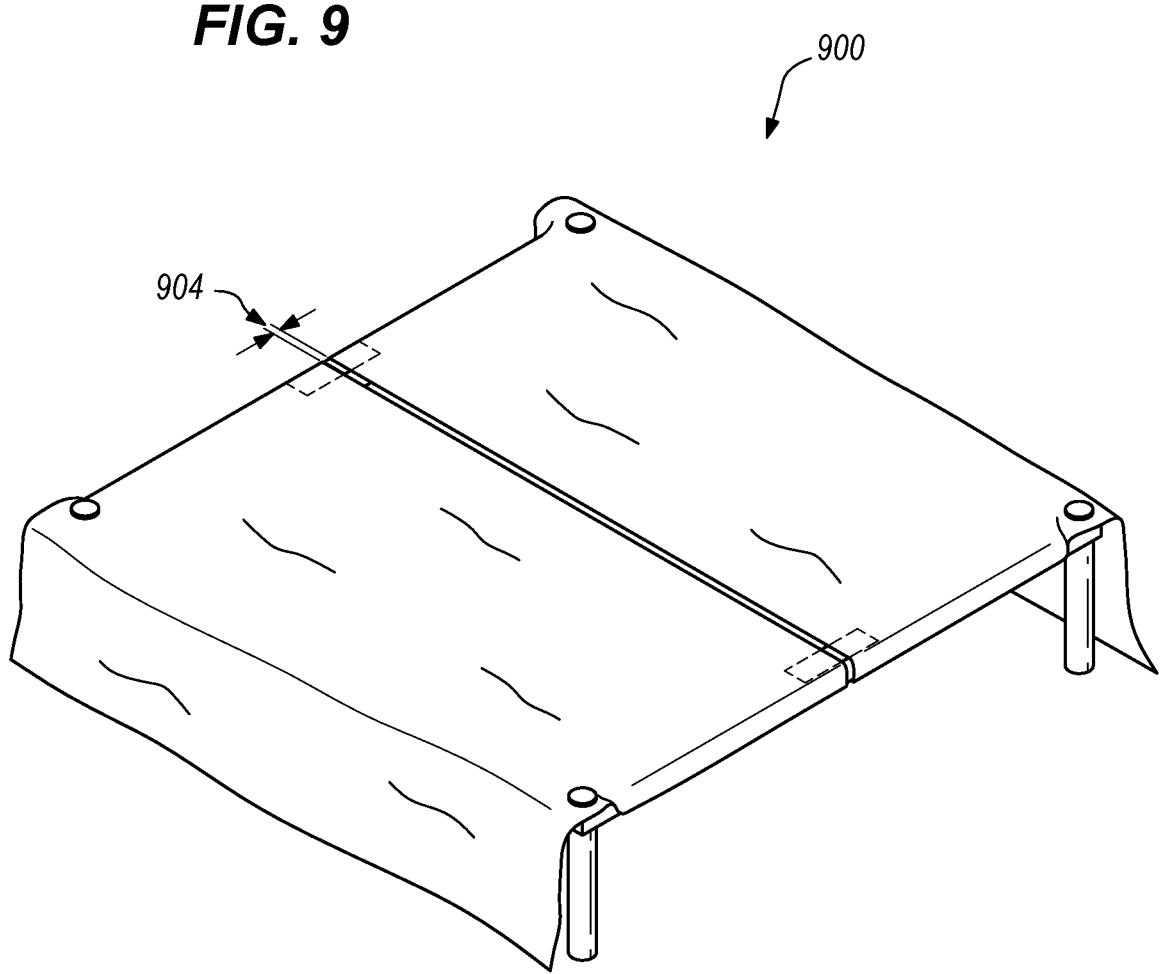
FIG. 9 illustrates a hunting blind frame covered by two flexible sheets of material, in accordance with one embodiment.

FIG. 9 shows an example of a hunting blind 900 with two flexible sheets of material coupled to the frame in a camouflaging position. A small gap 904 or separation in distance exists between two adjoining edges of the two flexible sheets of material. The flexible sheets of material are pulled sufficiently taught so that they are substantially horizontal on the frame. The term "substantially horizontal" is intended to mean that when the flexible sheet of material is mounted on the surface of the frame of the hunting blind that the predominant surface area of the flexible sheet of fabric would be considered by a hunter to be generally parallel to the surface of the frame.

The flexible sheet of material is also shown as being substantially flat. The term "substantially flat" is intended to mean that when the flexible sheet of fabric is mounted on the frame of the hunting blind that the predominant surface area of the flexible sheet of fabric would be considered by a hunter to form a generally planar surface.

Figure 10:
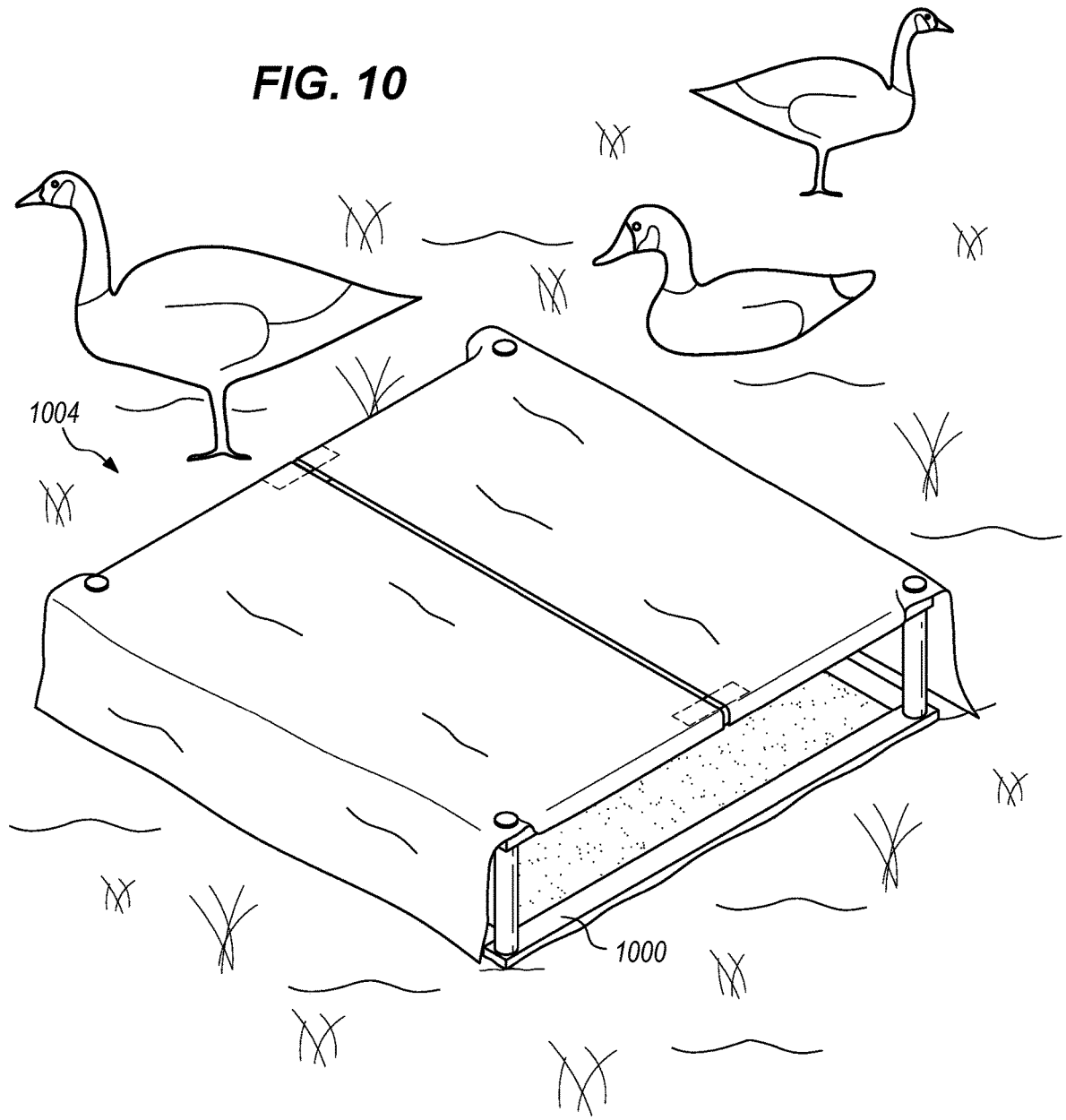
FIG. 10 illustrates a hunting blind disposed over a pit for hunting fowl, in accordance with one embodiment.

FIG. 10 illustrates an embodiment of a hunting blind 1004 placed over a pit 1000 in the field. As can be seen in FIG. 10, a frame for the hunting blind is disposed above a hunter's pit. A first flexible sheet of material and a second flexible sheet of material are disposed on top of the frame. The flexible sheets of material are coupled with the frame so that they form a relatively static appearance to any fowl in flight that are approaching the blind. The end portions of the flexible sheets of material extend beyond the outer perimeter of the frame and are shown resting on the ground. A hunter in the pit and disposed beneath the frame and flexible sheets of material is able to look through the transparent flexible sheets of material to watch for approaching fowl. In addition, the hunter can look through any gap left between the two flexible sheets of material. And, by elevating the frame above the pit by using short legs on the frame, a hunter may also look through the gap created between the frame and the top of the pit in order to watch for approaching fowl, as well as to make "calls" that simulate fowl on the ground. The legs of the hunting blind frame in this example elevate the frame sufficiently that a hunter in the pit can reach through the gap to adjust the flexible sheets of material on the top of the frame.

Figure 11A:
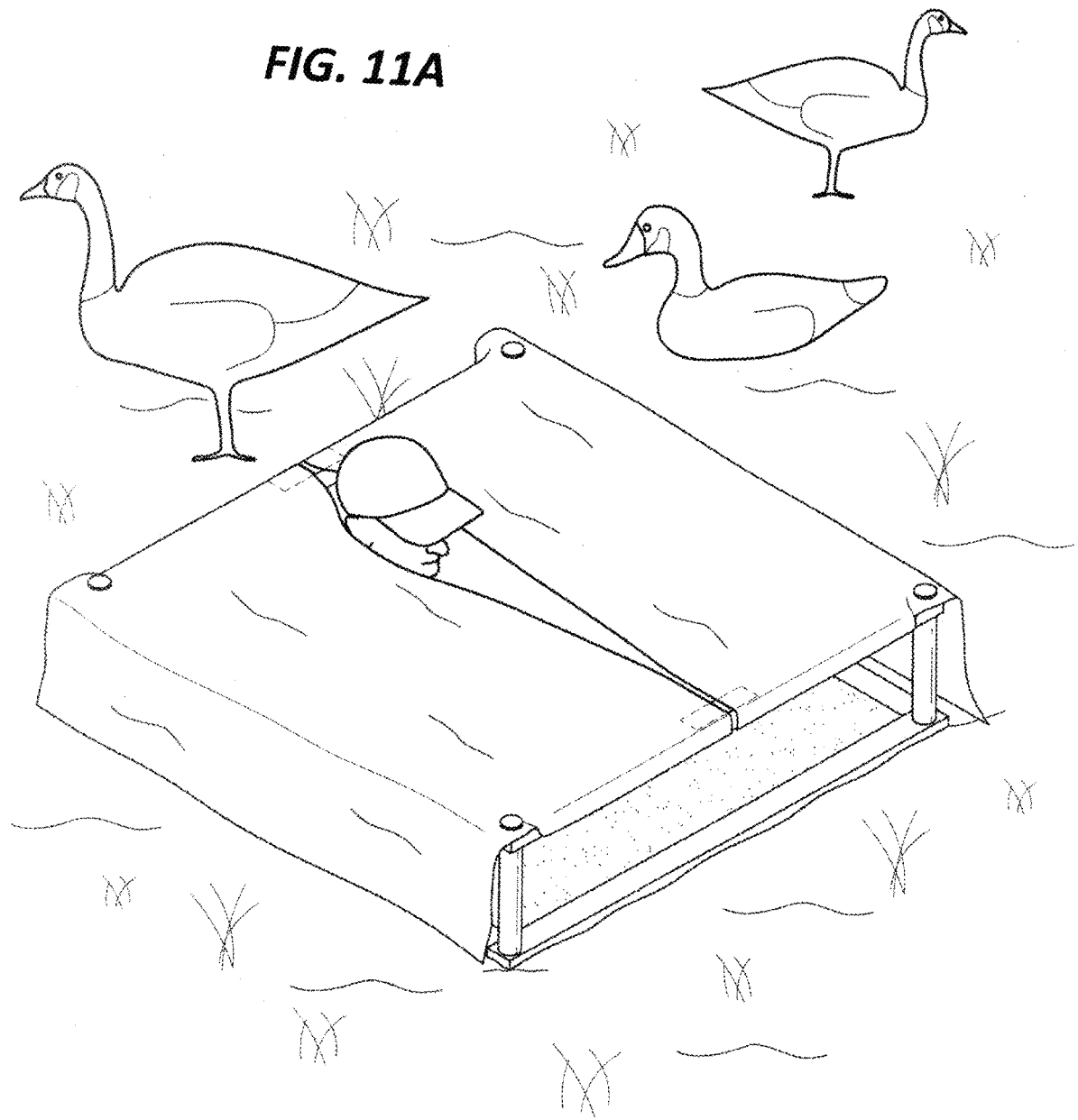
FIGS. 11A and 11B illustrate a hunter using a hunting blind to stealthily exit the blind and take aim at approaching fowl, in accordance with some embodiments.
Figure 11B:
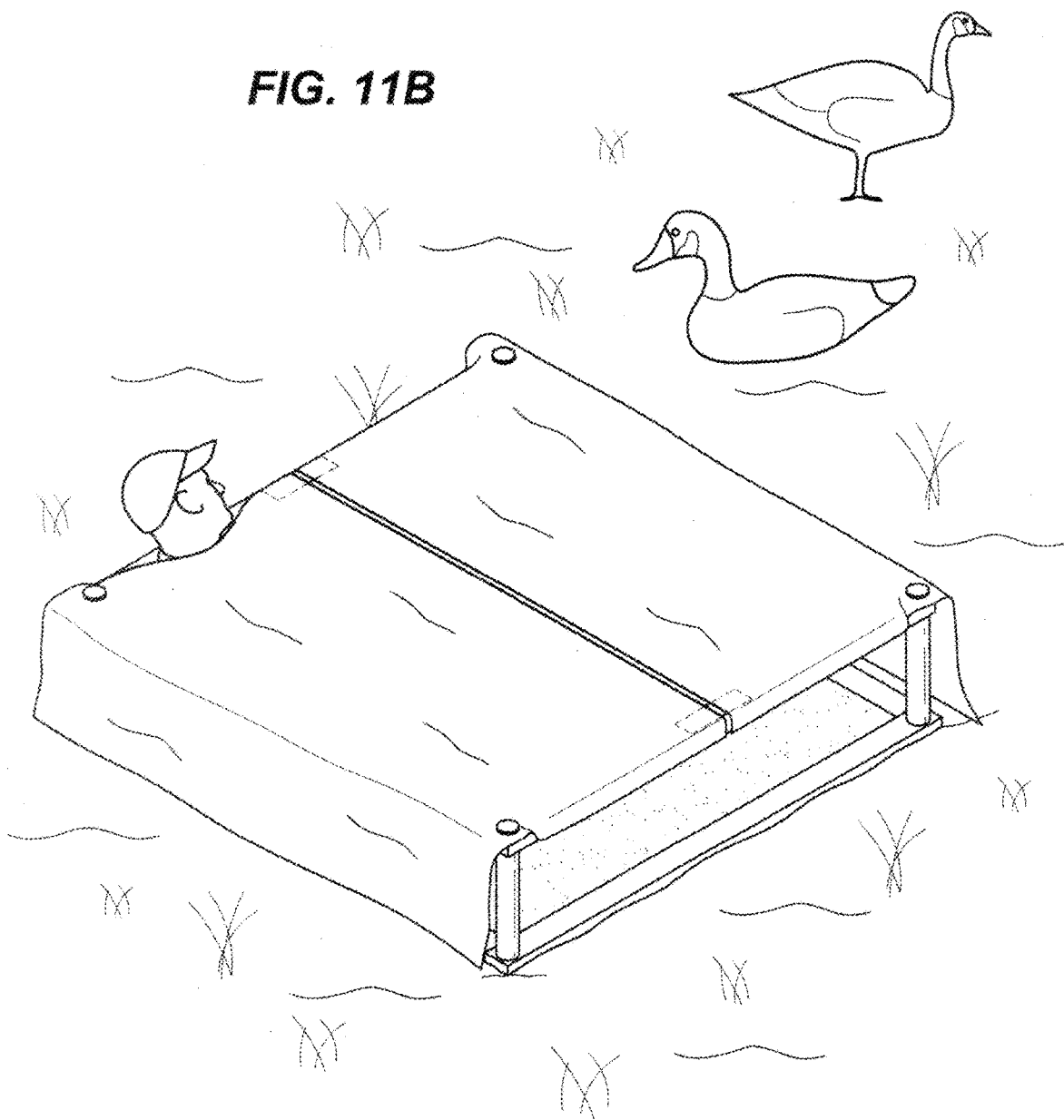

FIG. 11A illustrates an example of how a hunter can rise up between two flexible sheets of material that cover a hunting blind frame. The flexible sheets of material can be adjusted with enough slack to permit the hunter to push through a gap between the two flexible sheets of material with his or her head. This can be done without causing a lot of noise or movement of the blind. Thus, it is less likely to be detected by approaching fowl or to cause approaching fowl to flare. FIG. 11B illustrates how a hunter can rise up between a flexible sheet of material and a hunting blind frame.

Figure 12:
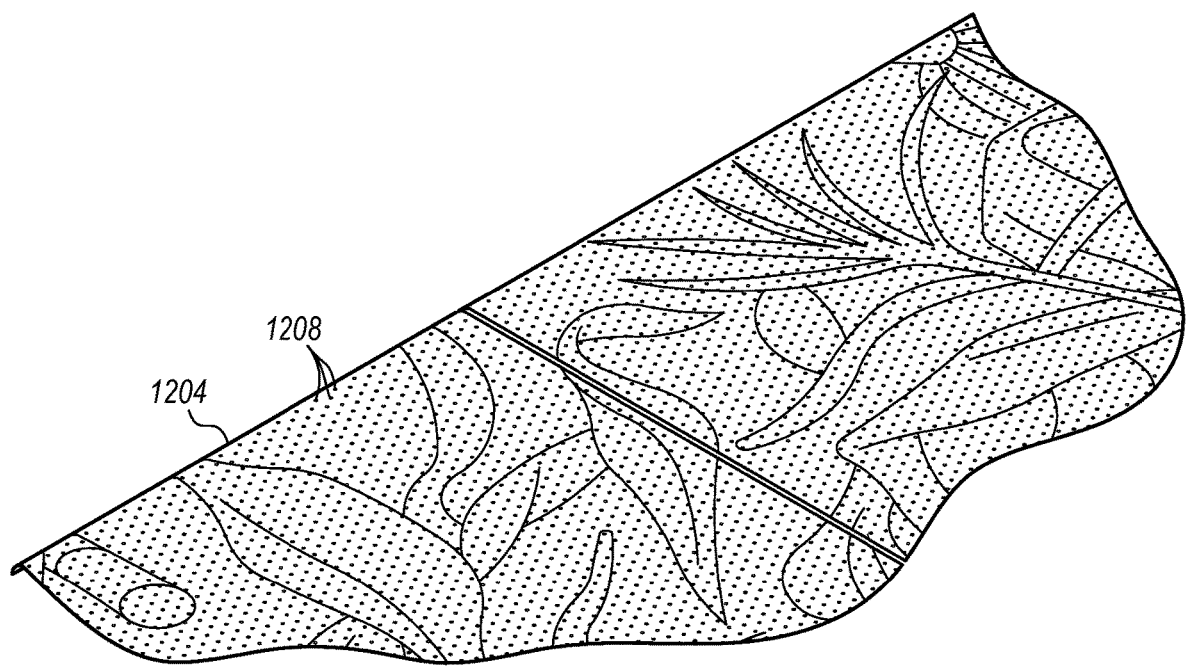
FIG. 12 illustrates a ventilated and camouflaged blind cover made from a flexible sheet of material in accordance with one embodiment.

FIG. 12 illustrates a close-up view of a portion of one type of fabric that can be used for the flexible sheets of material. In this embodiment, the fabric 1204 is not only camouflaged, it is also made with a pattern of holes 1208 in the fabric. The holes or openings serve at least two functions. They make the fabric more transparent and thus assist the hunter in the pit to see through the fabric. And, they make the fabric more suitable for windy conditions, as the air can blow through the holes and not blow the fabric off of the frame. Even without these holes, the flexible sheet of material can be fabricated from sufficiently transparent material to provide the hunter with a view of the sky and approaching fowl in flight. The holes also cause less muffling of the "calls" made by hunters underneath the fabric, thus producing more authentic "calls" for approaching fowl to hear.

In one embodiment, the flexible sheet of material can be integrated with less flexible ribs or frame members. Such ribs could be used to reduce rippling in the wind and to support the flexible sheet of material across the pit opening.

In another embodiment, a layout hunting blind can be utilized. Layout blinds are different from blinds used over pits. With a layout blind, a hunter lays on his or her back and looks upward for approaching fowl. When fowl approach, previous layout blinds have used mechanical mechanisms to throw open the covering of the layout blind. This exposes the hunter and allows the hunter to sit up and take aim. Such devices suffer from the same infirmities as described above for hatch covers for pits.

Figure 13:
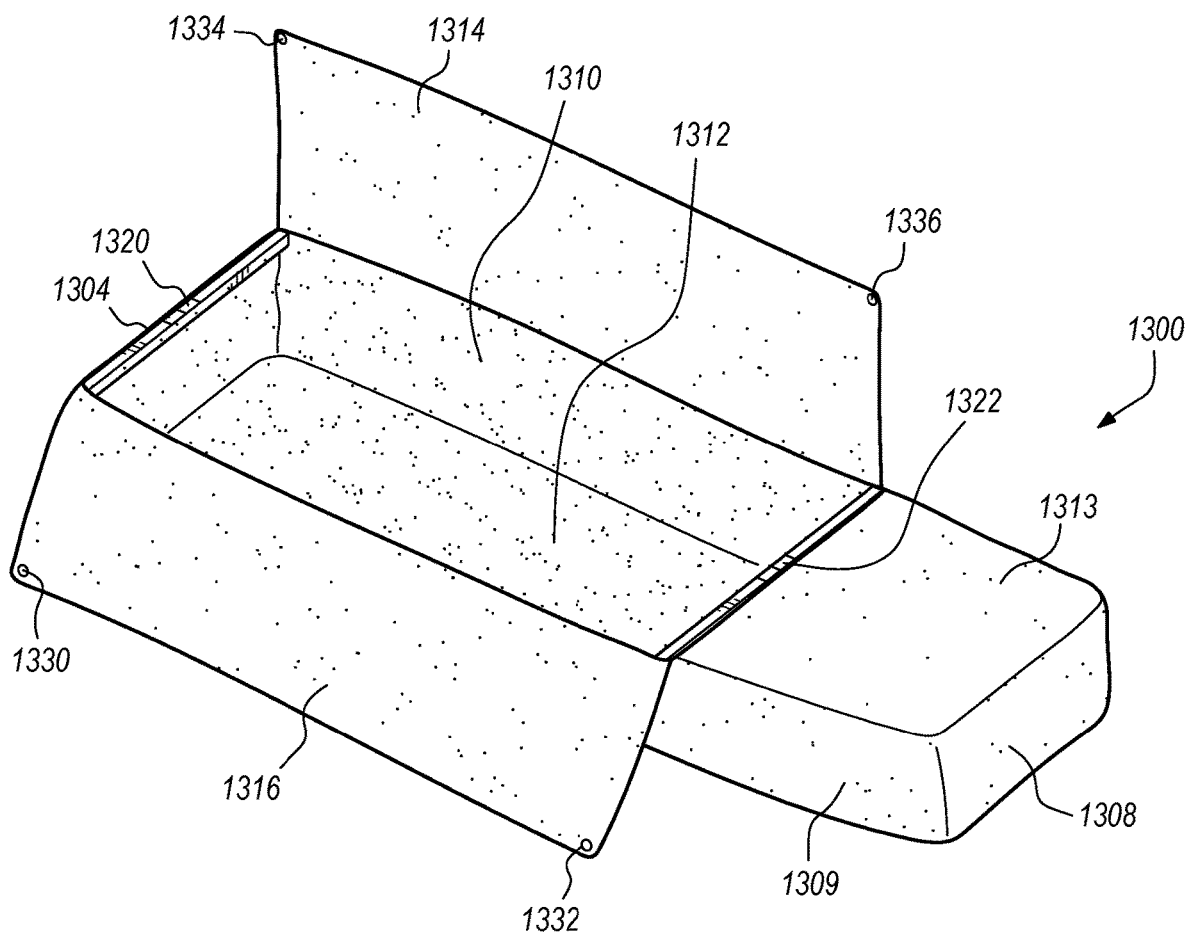
FIG. 13 illustrates an embodiment that could be used as a layout blind.

FIG. 13 shows an embodiment of a layout blind 1300. In this embodiment, the hunter lays on his or her back in a frame having a back wall 1312, a head wall 1304, a footwall 1308, a first sidewall 1309, and a second sidewall 1310. A top wall 1313 covers at least a portion of the hunter's legs during use. A first flexible sheet of material 1316 is coupled along a first edge portion of the flexible sheet of material with the first sidewall 1309. Although it could be coupled to the head wall and top wall. An opposing edge portion of the first flexible sheet of material is coupled to the frame with a coupler such as a magnetic coupler or hook and loop coupler. In the example shown in FIG. 13, magnet 1330 attached to a corner portion of the first flexible sheet of material can couple the first flexible sheet of material at a position along magnet 1320 on head wall 1304. Similarly, magnet 1332 attached to a corner portion of the first flexible sheet of material can couple the first flexible sheet of material to magnet 1322 which is attached to top wall 1313.

The second flexible sheet of material is coupled to the frame in a similar manner. For example, the second flexible sheet of material 1314 could be coupled along second sidewall 1310. Or, the second flexible sheet of material could be coupled at the head wall 1304 and top wall 1313. In this example, magnets 1334 and 1336 attached to the second flexible sheet of material can be used to couple the second flexible sheet of material along magnet 1320 and along magnet 1322.

During use of the layout blind, the hunter can look through the transparent flexible sheets of material for approaching fowl in flight. When desired, the hunter can push up through the flexible sheets of material with his or her gun or with his head and shoulders. Then the hunter can assume a shooting position for taking a shot at the fowl. This embodiment eliminates the need for the hunter to hand activate an opening mechanism. It keeps the hunter's hands free to use on his or her gun throughout the positioning, aiming, and firing process.

Figure 14:
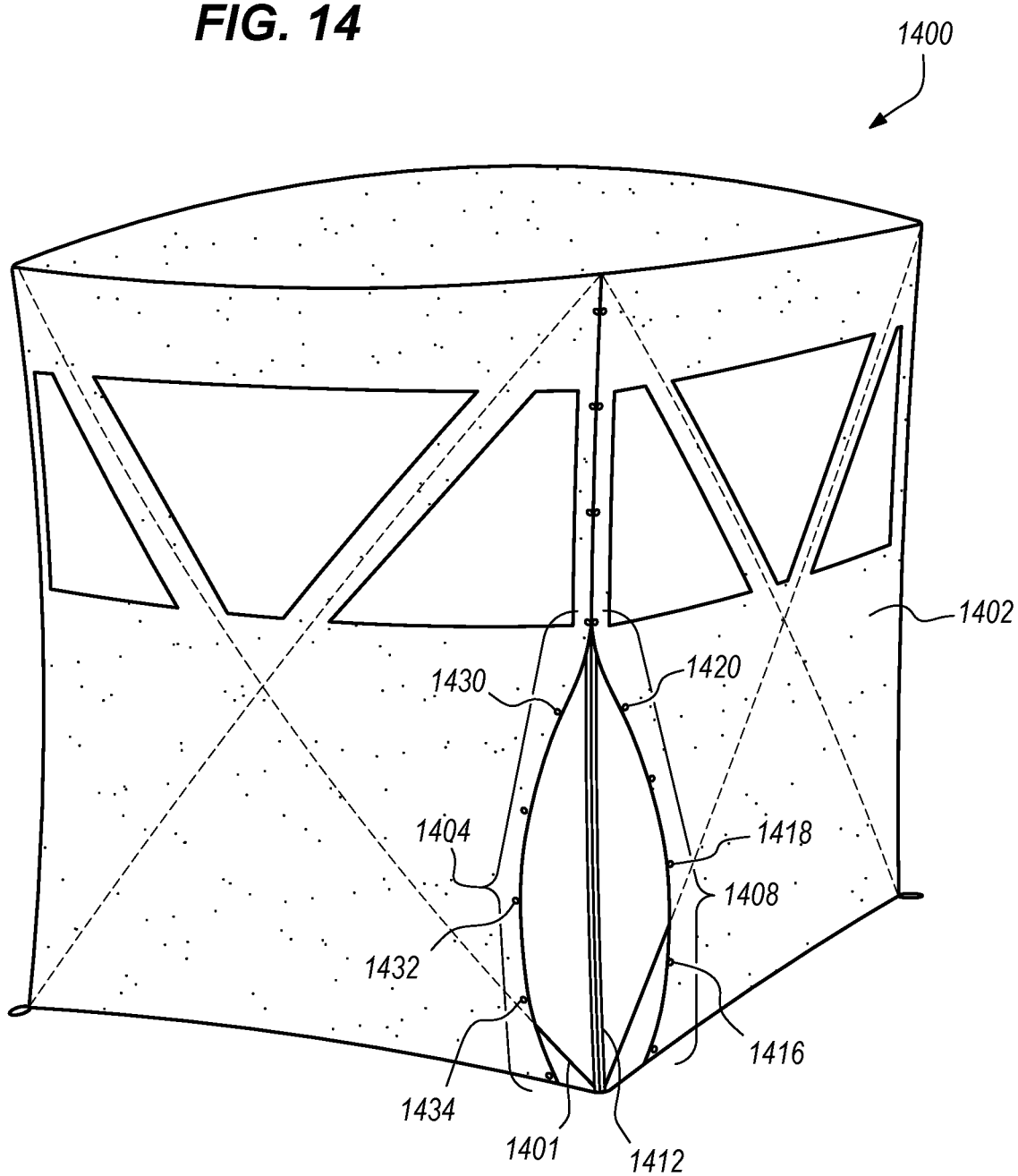
FIG. 14 illustrates an embodiment that could be used to quietly close camouflage walls or flaps of a vertical blind.

FIG. 14 illustrates an example of a hunting blind 1400 used for game such as deer, elk, and moose. One of the issues that hunters confront when using a blind for this type of game is that the game has extremely good hearing. Thus, the game can detect the sound of a hunter zipping up a hunting blind flap, closing the door of a hunting blind, or other noises associated with the opening and closing of hunting blinds. The hunting blind in FIG. 14 solves this issue of noisy hunting blinds.

The blind shown in FIG. 14 has a support frame 1401 and a frame covering 1402. The support frame, for example, could be a cube shaped structure formed by a series of connecting members. Many other shapes could be employed, as well. The frame covering could be a camouflaged fabric that conceals the presence of a hunter when the hunter is located inside the blind. A hunting blind entryway is formed by where a first portion of the frame covering 1404 separates from a second portion of the frame covering 1408. Magnetic couplings can be used to couple the first portion of the frame covering with either a frame member or with the second portion of the frame covering. For example, a vertical frame member 1412 can be made of ferromagnetic material. Magnets 1430, 1432, and 1434 attached to the first portion of the frame covering can magnetically couple with the ferromagnetic frame member. The second portion of the frame covering can either be attached to the frame member or couple to the frame member in a similar way with magnets 1420, 1418, and 1416 that are attached to the second portion of the frame covering.

Alternatively, magnets attached to the first portion of the frame covering can couple with magnets or ferromagnetic material (such as steel plates) attached to the second portion of the frame covering.

This type of entryway is very beneficial in that it makes very little noise when the coupling and de-coupling occur.

Thus, a hunter can set up his or her blind the night before a day of hunting and leave the entryway in an open position. When the hunter returns to the blind to begin hunting, the hunter is able to quietly close the blind, because magnets adhering to metal or adhering to another magnet do not create very much noise. Thus, a hunter can quietly enter the blind without alerting prey that the hunter has arrived. The same is true for exiting the blind—that too can be accomplished quietly and discretely using such quiet de-coupling.

Figure 15A:
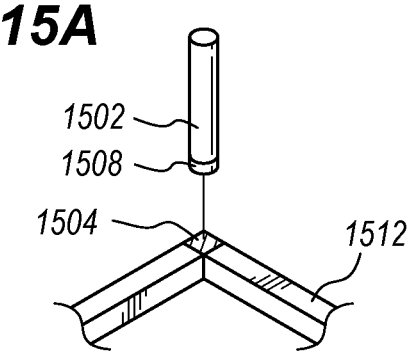
FIG. 15A illustrates removable foot pedestals for a blind frame in accordance with one embodiment.
Figure 15B:
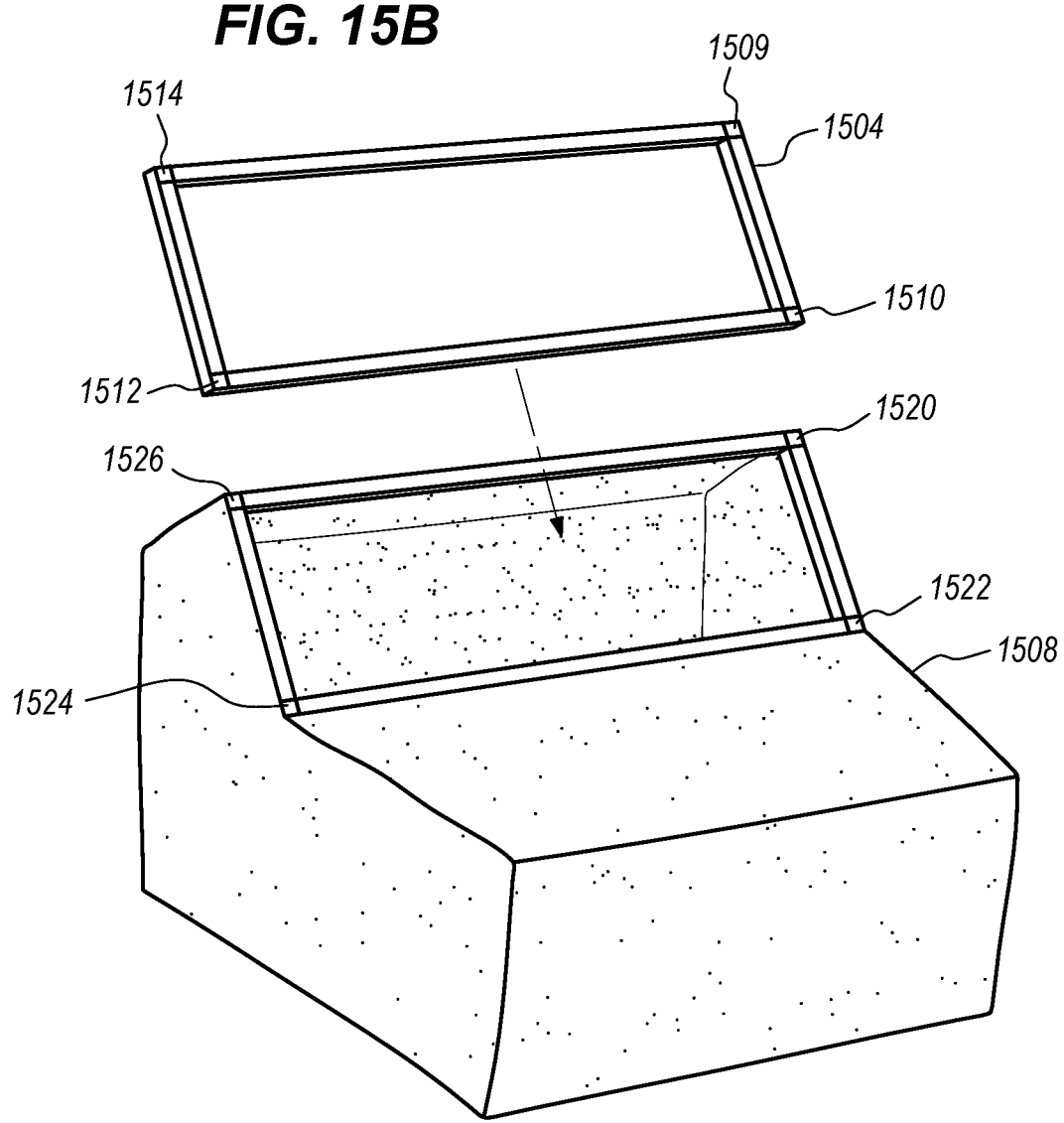
FIG. 15B illustrate how a low profile embodiment of a blind frame could be coupled over the opening of a duck hunting blind in accordance with one embodiment.

FIGS. 15A and 15B illustrate an embodiment that can be used for a hunting blind structure. As described above, in one embodiment of the frame, the frame can be constructed with removable legs. This is shown, for example, by FIG. 15A. In FIG. 15A, magnets can be placed on the corners of the frame and/or on the ends of the frame legs. For example, FIG. 15a shows a leg 1502 with a magnet 1508 attached to the top of a removable leg. A magnet 1504 is similarly attached to frame 1512. One might choose to use only one magnet on either the leg or frame and choose to make the adjoining surface ferromagnetic. By exerting a torque on the leg when the leg is in a coupled arrangement, the leg can be forced apart from the frame when desired. Removing all of the legs produces a low-profile frame that can be placed directly on the ground. This low profile may be more helpful in disguising a hunting pit.

In FIG. 15B, a frame with legs removed 1504, can be placed over the opening of a waterfowl hunting blind 1508. Waterfowl hunting blinds are usually placed near water and above ground in order to avoid any high water tables proximate to bodies of water. Waterfowl hunting blinds are often built in a box like form with an opening to allow hunters to see approaching fowl, such as ducks. In accordance with one embodiment, such structures can be modified to receive the low-profile frame described herein. For example, magnets or ferromagnetic plates can be fastened to the corners of the hunting blind opening. And the low-profile frame can be coupled to those magnets. For example, FIG. 15B shows the low-profile frame 1504 with magnets 1509, 1510, 1512, and 1514 positioned in each corner. Ferromagnetic plates, such as steel plates, 1520, 1522, 1524, and 1526 are attached to the waterfowl hunting blind 1508. The low profile frame is placed so that the magnets magnetically couple with the ferromagnetic plates.

The flexible sheets of material described herein can then be coupled to the frame to provide camouflage for hunters disposed in the blind and to permit shooting operations described above. Moreover, since multiple flexible sheets of material can be used on a single frame, a hunter can select the proper flexible sheet of material having the proper camouflage pattern for a particular waterfowl blind on a particular day. For example, if the day starts with light snow on the ground, flexible sheets of material having a snow pattern for camouflage can be used. As the day warms and the snow on the ground melts, flexible sheets of material that match the native terrain can be substituted for the initial flexible sheets of material. Depending on the size of the opening in the waterfowl hunting blind, more than one flexible sheet of material can be used at the same time to cover the opening of the waterfowl hunting blind. A hunter may then use the opening between two adjoining flexible sheets of material to push his or her firearm and/or body through the flexible sheets of material. Similarly, for openings larger than one frame, multiple frames can be used in combination with one another on a waterfowl hunting blind.

Alternatively, one might choose to adhere the frame to the waterfowl hunting blind using a different type of coupling such as a hook and loop coupling. An expandable frame can be attached to waterfowl hunting blinds that have different sized openings by expanding or collapsing the blind frame as needed.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

The above specification and examples provide a complete description of the structure and use of exemplary embodiments of the invention. Furthermore, structural features of the different implementations may be combined in yet another implementation without departing from the recited claims.

What is claimed is:

1. An apparatus comprising:
    a frame comprising:
        a first support member; and
        a second support member;
    a first flexible sheet of fabric comprising:
        a first end portion; and
        a second end portion on an opposing end of the fabric from the first end portion;
    a coupler coupled with the first end portion and configured to couple the first end portion with the first support member of the frame;
    wherein the coupler is configured to decouple the first end portion from the first support member via a hands-free operation;
    wherein the first flexible sheet of fabric is coupled with the frame at a location along the first support member so as to allow a hunter to extend his head between the first flexible sheet of fabric and the frame without causing the coupler to decouple.

2. The apparatus of claim 1 wherein the frame is configured to receive the coupler along a continuous portion of the first frame member so as to provide adjustable positioning of the first flexible sheet of fabric along the continuous portion.

3. The apparatus of claim 2 wherein at least a portion of the first frame member is ferromagnetic and wherein the coupler comprises a magnet.

4. The apparatus of claim 2 and further comprising:
    a continuous portion of loop material attached to the first support member of the frame;
    wherein the coupler comprises hook material.

5. The apparatus of claim 2 and further comprising:
    a continuous portion of hook material attached to the first support member of the frame;
    wherein the coupler comprises loop material.

6. The apparatus of claim 1 wherein the coupler being configured to decouple the first end portion from the first support member via a hands-free operation comprises the coupler being configured to decouple in response to a person using his head or shoulder to push the first flexible sheet of fabric away from the frame.

7. The apparatus of claim 1 wherein the coupler being configured to decouple the first end portion from the first support member via a hands-free operation comprises the coupler being configured to decouple in response to a person using a firearm to push the first flexible sheet of fabric away from the frame.

8. The apparatus of claim 1 and further comprising:
a second coupler coupled with the second end portion and configured to couple the second end portion with the second support member of the frame.

9. The apparatus of claim 1 wherein the coupler is freeze-resistant.

10. The apparatus of claim 1 wherein the frame is configured to hold the first flexible sheet of fabric in a substantially horizontal and substantially flat orientation above a ground surface.

11. The apparatus of claim 1 wherein the frame is sized for positioning over a fowl hunting pit.

12. The apparatus of claim 1 wherein the frame is sized for positioning over a fowl hunting pit; and
wherein the first flexible sheet of fabric is sufficiently transparent to provide a hunter with an unblocked view of the sky when the hunter is positioned in the pit.

13. The apparatus of claim 1 wherein the frame is sized for positioning over a fowl hunting pit; and
wherein the first flexible sheet of fabric is sufficiently flexible to provide a hunter with an unimpeded shot when the hunter is positioned in the pit and the first flexible sheet of fabric is decoupled from the frame.

14. The apparatus of claim 1 wherein the frame is sized for positioning over a fowl hunting pit sized for housing at least three hunters; and
wherein the first flexible sheet of fabric is sufficiently transparent to provide all of the at least three hunters with an unblocked view of the sky when all of the at least three hunters are positioned in the pit.

15. An apparatus comprising:
a frame comprising:
a first support member; and
a second support member;
a first flexible sheet of fabric comprising:
a first end portion; and
a second end portion on an opposing end of the first flexible sheet of fabric from the first end portion;
a first coupler coupled with the first end portion and configured to couple the first end portion with the first support member of the frame;
wherein the first coupler is configured to decouple the first end portion from the first support member via a hands-free operation;
a second coupler coupled with the second end portion and configured to couple the second end portion with the second support member of the frame;
a second flexible sheet of fabric comprising:
a third end portion; and
a fourth end portion on an opposing end of the second flexible sheet of fabric from the third end portion;
a third coupler coupled with the third end portion and configured to couple the third end portion with the first support member of the frame;
wherein the third coupler is configured to decouple the third end portion from the first support member via a hands-free operation;
wherein the first flexible sheet of fabric and the second flexible sheet of fabric are positioned in substantially parallel position on the frame with an opening between the first flexible sheet of fabric and the second flexible sheet of fabric; and
wherein the first flexible sheet of fabric is coupled with the frame at a location along the first support member so as to allow a hunter to extend his head between the first flexible sheet of fabric and the second flexible sheet of fabric without causing any of the couplers to decouple.

16. The apparatus of claim 15 and further comprising:
a fourth coupler coupled with the fourth end portion.

* * * * *